United States Patent
Moser (10) Patent No.: US 8,855,669 B2
(45) Date of Patent: Oct. 7, 2014

(54) CROWD DETECTION AND GUIDANCE ON MOBILE DEVICES

(75) Inventor: Martin Moser, Speyer (DE)

(73) Assignee: SAP AG, Walldorf (DE)

( * ) Notice: Subject to any disclaimer, the term of this patent is extended or adjusted under 35 U.S.C. 154(b) by 474 days.

(21) Appl. No.: 13/329,154

(22) Filed: Dec. 16, 2011

(65) Prior Publication Data
US 2013/0157684 A1    Jun. 20, 2013

(51) Int. Cl.
*H04W 24/00* (2009.01)
*H04M 11/04* (2006.01)

(52) U.S. Cl.
USPC .............. 455/456.1; 455/404.1; 455/404.2; 455/456.3

(58) Field of Classification Search
CPC .................................... H04W 64/00
USPC .................................... 455/456.1
See application file for complete search history.

(56) References Cited

U.S. PATENT DOCUMENTS

| | | | |
|---|---|---|---|
| 8,320,939 B1 * | 11/2012 | Vincent | 455/456.1 |
| 2009/0138353 A1 * | 5/2009 | Mendelson | 705/14 |
| 2011/0183644 A1 * | 7/2011 | Gupta | 455/404.2 |

OTHER PUBLICATIONS

Alger, Michael, "Real-time tra?c monitoring using mobile phone data", [Online]. Retrieved from the Internet: <URL: http://www.smithinst.ac.uk/Projects/ESGI49/ESGI49-Vodafone/Report/TrafficMonitoring.pdf>, (Jan. 14, 2005), 12 pgs.

* cited by examiner

*Primary Examiner* — Huy C Ho
(74) *Attorney, Agent, or Firm* — Schwegman Lundberg & Woessner, P.A.

(57) ABSTRACT

Systems and methods to detect an overcrowded area and to provide guidance to people in and in the vicinity of the overcrowded area are provided. A census module is configured to determine a number of mobile client machines located in a defined geographical area. A capacity module is configured to determine that a capacity assigned to the defined geographical area is exceeded. The capacity is a number of people that is used to provide an indication that the defined geographical area is overcrowded. The determination is based on the number of mobile client machines located in the defined geographical area. An exit module is configured to assign an exit route to an exit of the defined geographical area to a client machine of the mobile client machines within the defined geographical area. A navigation module is configured to transmit instructions comprising the exit route to the client machine.

20 Claims, 9 Drawing Sheets

CROWD DETECTION AND GUIDANCE ON MOBILE DEVICES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright SAP AG 2011, All Rights Reserved.

TECHNICAL FIELD

This patent document pertains generally to mobile communications, and more particularly, but not by way of limitation, to crowd detection and guidance on mobile devices.

BACKGROUND

Personal mobile devices such as cell phones, smart phones, and tablet computers include technology that can be used to determine the location of the mobile device. The technologies include, for example, the Global Positioning System (GPS), identification of a cell tower with which the mobile device is registered, and multilateration of radio signals.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Overcrowding of a geographical area is common in urban areas. For example, festivals, conventions, sporting events, protests, riots, holiday celebrations, and other planned or spontaneous events may cause a small area to quickly become overcrowded. When an area is over-crowded, the safety of the people in the crowd becomes a priority for public safety officials. One way to address the safety issues is to dissipate the crowd to other areas by directing people to and along exit routes. However, in an overcrowded area, people may not know how to navigate to and through the exits. Further, loudspeakers, bullhorns, or other tactics to dissipate the crowd may be ineffective or result in violations of civil rights.

Embodiments of the systems and methods described herein provide crowd detection and dissipation using mobile devices. The system may use existing technologies such as GPS and multilateration of radio signals to determine an approximate location of the mobile devices. The locations of a plurality of mobile devices within a defined geographic area are monitored. If the system determines that the number of mobile devices in the area exceed a pre-determined threshold, the system identifies the area as being overcrowded. The system may send alerts to mobile devices identified as moving closer to the overcrowded area instructing the user to avoid the area.

In further embodiments, the systems may identify one or more available exit routes from the overcrowded area. The exit routes may identified based on maps of the area, police presence and barricades within the area, the location of other mobile devices in the area, and data about events occurring in the area. The system may then provide instructions to the user to navigate away from the overcrowded area via the exit routes.

Figure 1:
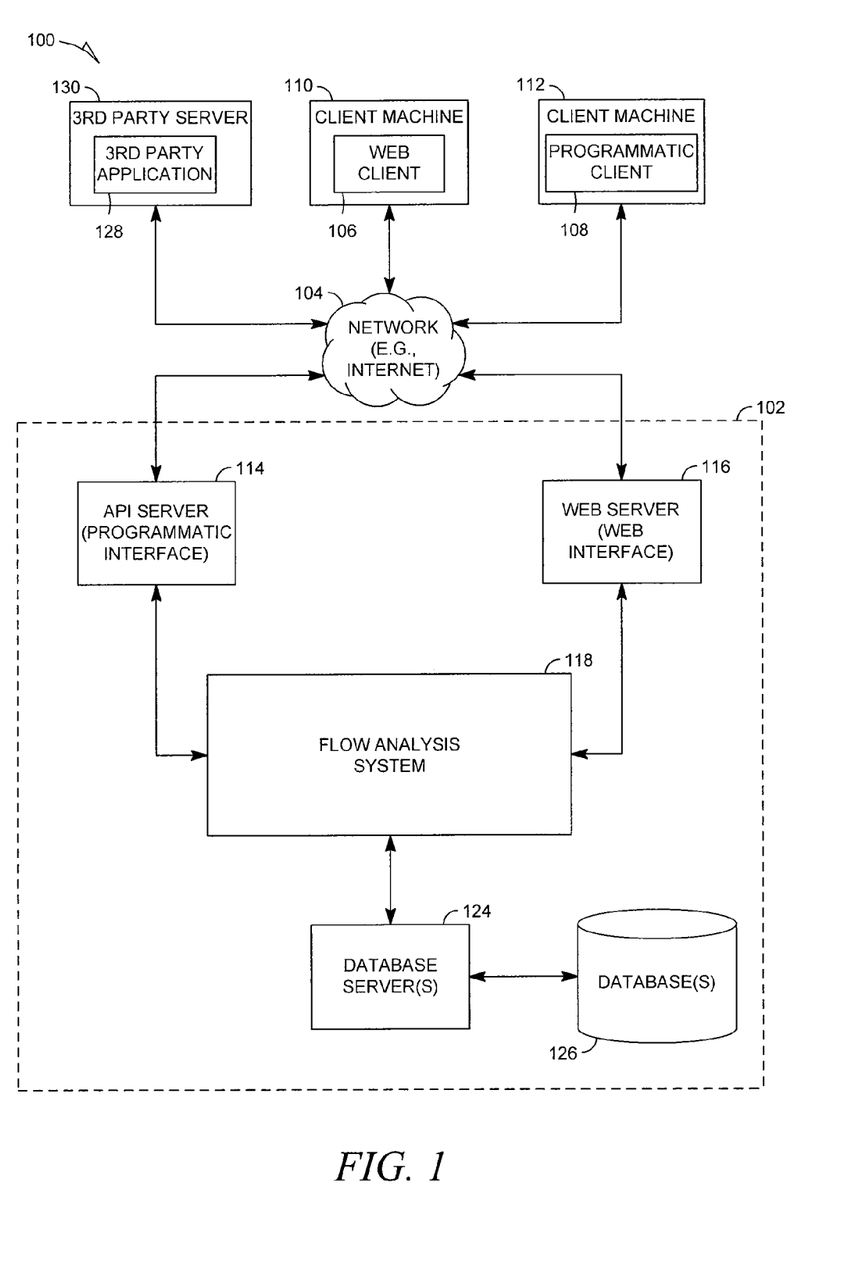
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based public safety alert system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, a flow analysis system 118. The flow analysis system 118 is, in turn, shown to be coupled to one or more databases servers 124 that facilitate access to one or more databases 126.

Further, while the system 100 shown in FIG. 1 employs a client-server architecture, the present invention is of course not limited to such an architecture, and could equally well find application in a distributed, or peer-to-peer, architecture system, for example.

The web client 106 accesses the flow analysis system 118 via the web interface supported by the web server 116. Similarly, the programmatic client 108 accesses the various services and functions provided by the flow analysis system 118 via the programmatic interface provided by the API server 114. In some instances, the flow analysis system 118 may access the web client 106 or the programmatic client 108 via the web interface supported by the web server 116 or the programmatic interface provided by the API server 114, respectively.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
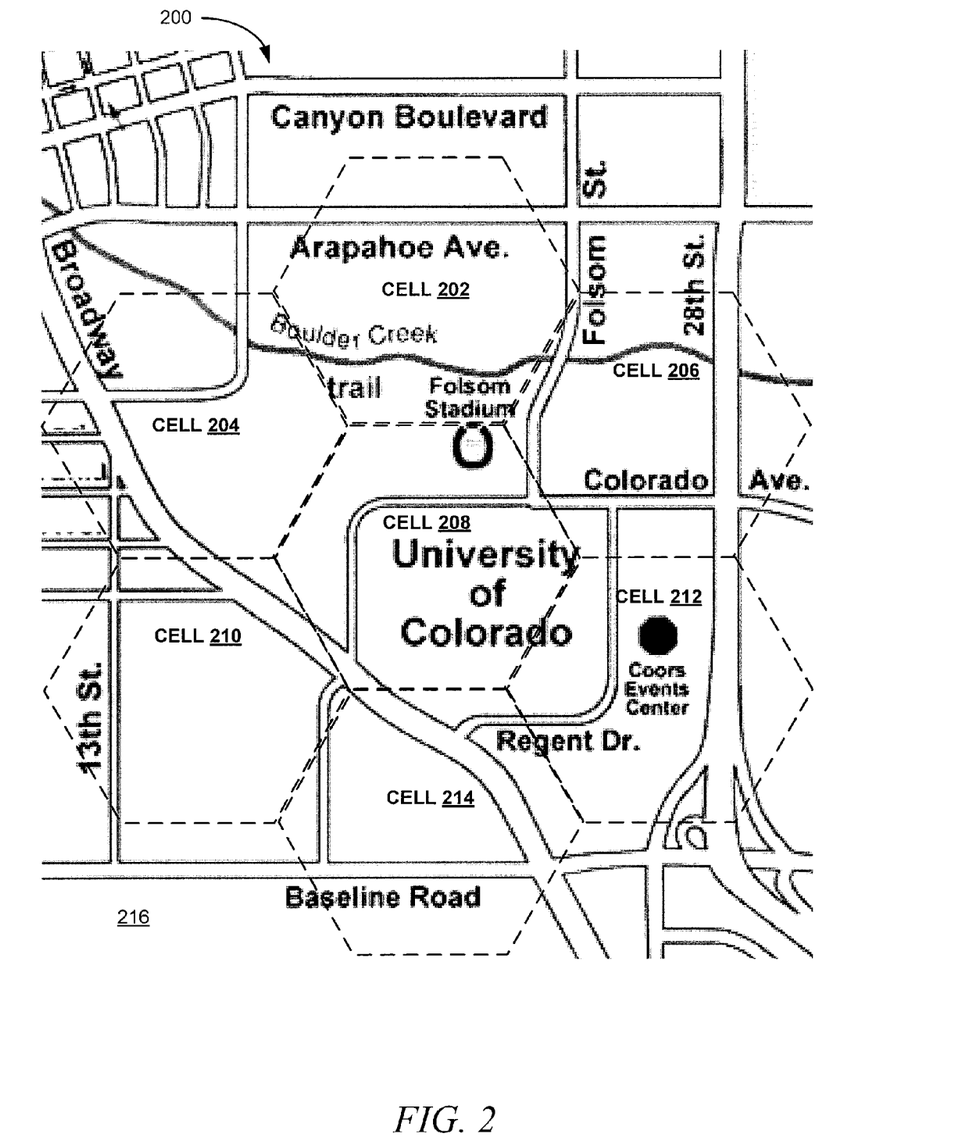
FIG. 2 is an illustration of an environment in which various embodiments may be used.

FIG. 2 is an illustration of an environment 200 in which various embodiments may be used. The environment 200 is depicted as a series of cells 202-214 within a cellular telephone network over a portion of a mapped area 216.

The cells 202-214 each represent an area serviced by a cell tower to provide cellular communications service to the devices within the area. While the cells 202-214 are depicted as being approximately the same size, it is understood that the size of the cells may vary depending on, for example, the placement of cell towers. Further, the cells 202-214 are not drawn to scale and are provided only to illustrate embodiments. The cells 202-214 may overlap with one another. In some embodiments, the location of client machines may be roughly determined based on which cell tower is currently providing service to the client machine (i.e., the cell tower that the client machine is registered to).

In some instances, each cell 202-214 may be associated with one or more features or landmarks located within the cell. For example, as depicted, cell 208 encompasses the "Folsom Stadium" and cell 212 encompasses the "Coors Event Center." Each cell tower is further associated with a predetermined capacity (e.g., a finite number of calls or data traffic that the cell tower can handle at once).

Figure 3:
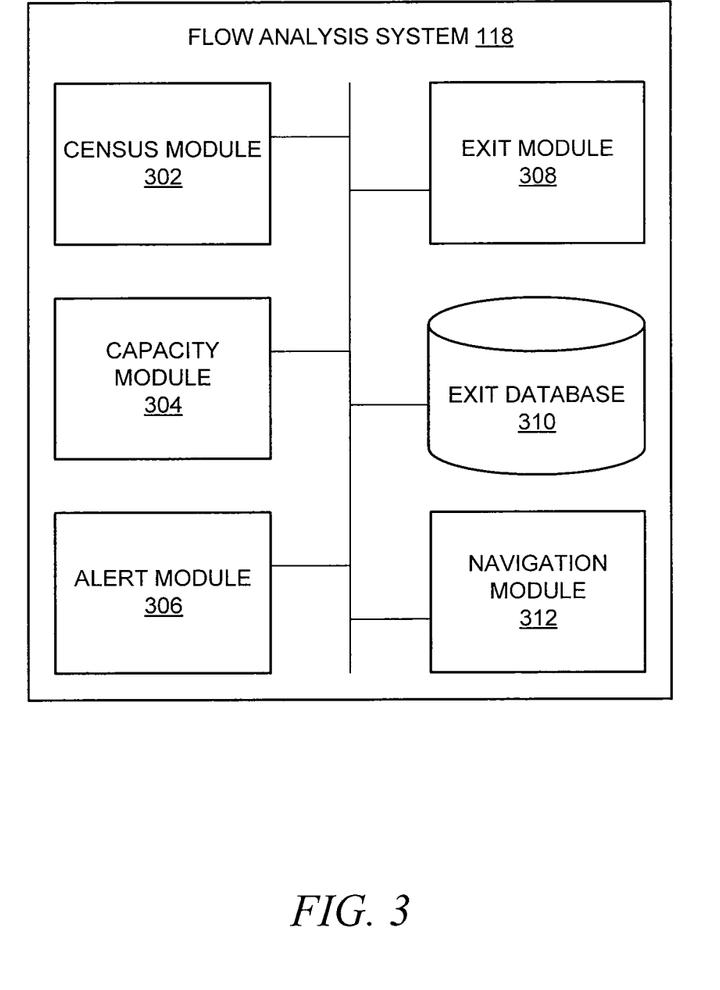
FIG. 3 is a block diagram of a flow analysis system, according to example embodiment.

FIG. 3 is a block diagram of the flow analysis system 118, according to example embodiment. The flow analysis system 118 may be implemented in hardware, software, or combinations thereof. If implemented in software, the modules of the flow analysis system 118 may perform various functions using one or more hardware processors that execute instructions embodied on a non-transitory machine-readable storage medium.

A census module 302 of the flow analysis system 118 is configured to determine a number of client machines located within a defined geographical area. The client machines may be cellular telephones, smart phones, GPS navigation devices, or other handheld computer systems represented by client machines 110, 112, and 130. The defined geographical area may be defined as a set of geographical coordinates or as a cell (e.g., cells 202-214). In some instances, the defined geographical area may be pre-defined (e.g., an area including and around a stadium) or may be defined in real time (e.g., in response to a moving group of rioters). To determine the number of client machines within a cell, the census module 302 may determine the number of client machines registered with the cell tower corresponding to the cell, use a GPS to identify client machines within a geographical area corresponding to the cell, or use another method to identify client machines located in the cell.

In some instances, a single client machine (e.g., a smart phone) may be located within a cell using GPS and by virtue of being registered with the cell tower. In these instances, instead of counting the smart phone as two client machines, the census module 302 may determine that the client machine registered with the cell tower is identical to the UPS-identified client machine. This determination may be performed by comparing identifiers of client machines registered with the cell tower to identifiers of client machines identified using GPS. The identifier may be a SIM card number of the client machine registered with the tower or transmitted with the GPS data.

Based on the number of client machines located within a particular cell, a capacity module 304 is configured to determine whether the number exceeds a capacity of the cell. As used herein, the capacity of the cell is not equivalent to the predetermined capacity of the cell tower. Instead, the capacity of the cell is an assigned number that is based on the number of people that can be in the geographic area without dangerous overcrowding of the area. If the number of people in the defined geographic area exceeds the capacity, an indication is provided to indicate that the area is over-crowded. The capacity of the cell may vary based on, for example, a schedule of planned events. To illustrate, a cell comprising a football stadium may have a lower capacity when no game is scheduled. On a day when a game is scheduled, the capacity of the cell may increase by tens of thousands of people to accommodate the spectators of the game. Some cells may have a capacity that varies with the day of the week. For example, a cell containing financial district may have a higher capacity on workdays and a lower capacity on weekends and holidays. Similarly, a cell containing a park may have a higher capacity on weekends and holidays and a lower capacity on workdays. The geography of the cell may further affect how much the capacity of the cell is allowed to change. For example, the population of an area of dense city streets may remain high but fairly constant day-to-day. A dramatic increase in population in the area may indicate that the area is overcrowded. However, a cell in a vacation destination may expect a dramatic increase in population on certain holidays.

In some instances, the capacity of the cell may vary according to time of day. Returning to the football stadium example, the capacity of the cell may be very high before and during the game but drops within a predetermined amount of time after the game has ended. The drop in the capacity of the cell may be according to a known function such as a linear function, a step function, or an exponential function. In some instances, to trigger the alerts or exit route navigation, the capacity may be lowered even if it is not expected that the crowd will dissipate according to the function.

If the capacity of the cell is exceeded, an alert module 306 is configured to determine which client machines are headed toward the cell from other cells and to warn the users of the client machines to avoid the area. The alert module 306 may identify client devices located in neighboring or adjacent cells that are initiating a hand over from the cell tower of an uncrowded cell to the cell tower of the crowded cell. In GPS-enabled client machines, a change of position from a location further from the overcrowded area to a location closer to the overcrowded area may be detected.

Upon detecting that a client machines is approaching the overcrowded geographical area corresponding to the cell, the alert module 306 is configured to transmit an alert to those client machines. The alert may be an email, a text message (e.g., an SMS message), a multimedia message (e.g., an MMS message), an application notification on a smart phone, a navigation alert on a GPS device, or another electronic transmission. The alert may be an indication that the user is approaching the overcrowded area and include a description of the overcrowded area, a map of routes to circumnavigate the overcrowded area, directions leading away from the overcrowded area, or the like.

An exit module 308 is configured to assign exits and exits routes to people so that they may leave the overcrowded area. The exits may be predetermined by, for example, public safety officials or may be determined in real time based on traffic patterns in the vicinity of the overcrowded area. The users of the client machines may not have the ability to input or select an exit that is the user's destination. Rather, the exit is assigned to the user as the user's destination.

The exit module 308, to determine the exits and exit routes, may have access to an exit database 310. The exit database 310 may store records of predetermined exit routes or information about the area itself. Exit routes may be predetermined by public safety officials for events that are expected to cause overcrowding, such as sporting events. The information about the area itself may include a map of thoroughfares within the area. The thoroughfares may include walking trails, sidewalks, bicycle routes, roads, or the like. Other information about the area may include topographical information. The information may further include temporary features of the area such as fenced-off areas, police barricades, routes designated for automobile traffic, flooded areas, fires, and the like.

In instances where a geographic area is overcrowded for an extended period of time, such as a protest or natural disaster relief shelter enduring over a period of days or weeks, the exit module 310 may include additional landmark information about the overcrowded area such as the location of police services, medical services, food and water distribution centers, and other services available to the people in the overcrowded area.

Based on the information in the exit database 310, the exit module 310 is configured to determine or select an exit route (or route to a landmark) for at least a portion of the users of the client machines in the overcrowded area. In some instances, a public safety official may access the exit module 308 or the exit database 310 using a client machine (e.g., client machine 110, 112, or 130) within or in the vicinity of the overcrowded area. The public safety official may, for example, add a temporary feature to the exit database 310, draft exit routes, select an exit route, or perform other tasks.

A navigation module 312, upon receiving an exit or exit route from the exit module 308, is configured to transmit directions to exits to client machines located in the overcrowded area. The directions may be sent as an email, a text message (e.g., an SMS message), a multimedia message (e.g., an MMS message), an application notification on a smart phone, a navigation alert on a GPS device, or another electronic transmission. The directions may be displayed, in whole or in part, on a screen of the client machine or may be provided audibly via a speaker on the client machine. In some instances, the client machine may vibrate to communicate the directions. The directions may be provided with a map of the overcrowded area and vicinity.

Figure 4:
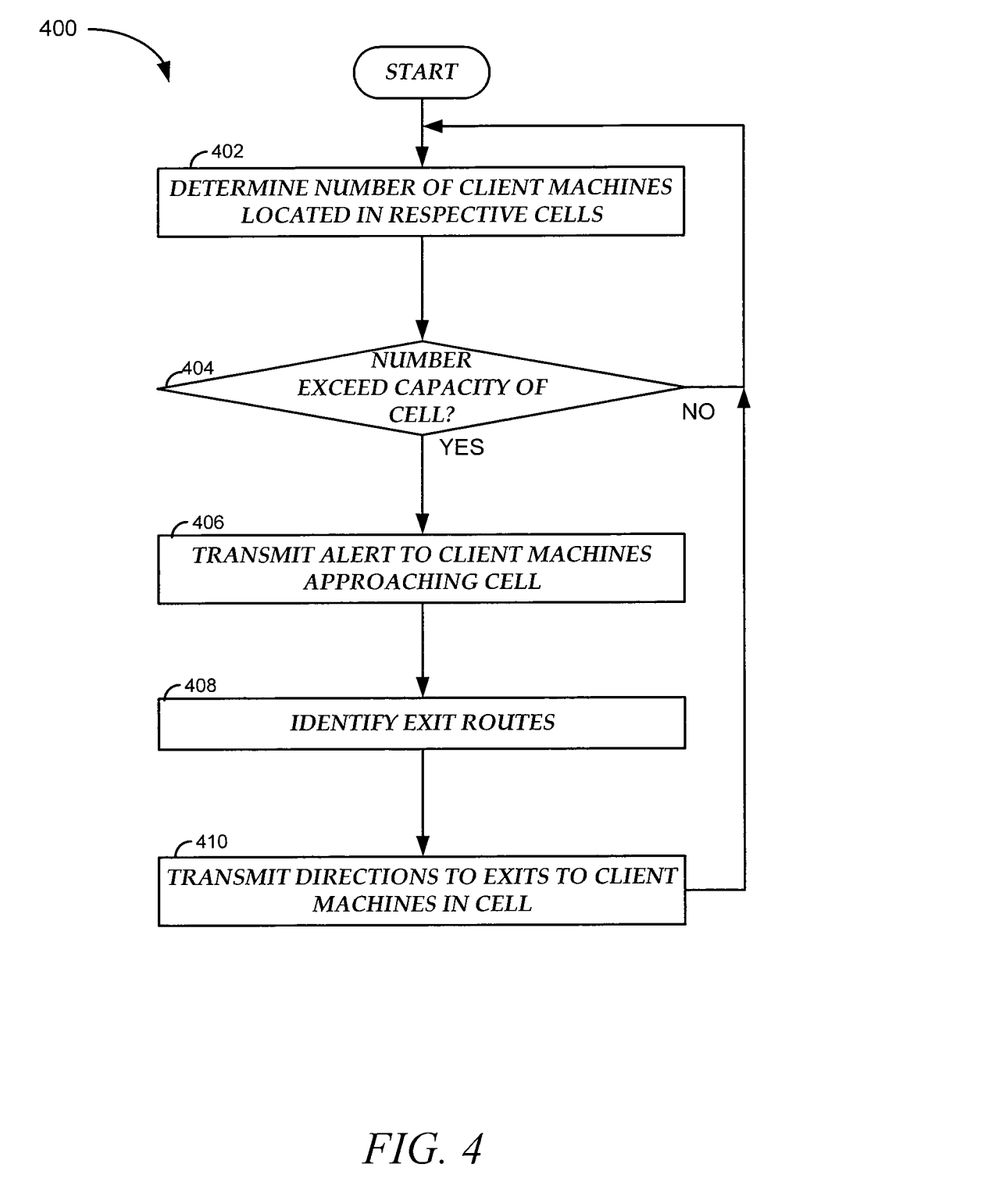
FIG. 4 is a flow chart illustrating a method to detect and provide guidance to member of a crowd, according to an example embodiment.

FIG. 4 is a flow chart illustrating a method 400 to detect and provide guidance to member of a crowd, according to an example embodiment. The method 400 may be performed using one or more processors and/or by the flow analysis system 118.

In an operation 402, a number of client machines located in respective cells corresponding to a defined geographic area are determined. The number of client machines may be determined based on the number of machines registered with the cell tower of the cell or GPS data received from the client devices within the cell. In some embodiments, the determination may be modified upon determining that a client machine registered with the cell tower has also transmitted GPS data to the census module 302.

Further, the census data may be revised based on assumptions about the number of client machines of each user in the cell, the number of users associated with each client machine, and the number of people in the cell who are not associated with any client device. For example, at a technology convention, it may be assumed that each person is carrying at least two client machines but at a child-friendly convention, it may be assumed that children do not carry a client machine and so each client device is associated with a parent and at least one child. Likewise, in a natural disaster, it may be assumed that some people may not have a working client device. These considerations may be translated into one or more rules that may be applied to the initial count of client machines to arrive at an estimated population of the overcrowded area. These assumptions may be provided by a public safety official using a client device within the overcrowded area.

In an operation 404, a determination is made as to whether the number of client machines or estimated population of the overcrowded area exceeds the capacity of the cell. The capacity of the cell may be day and time dependent. If the capacity of the cell is not exceeded, the method 400 returns to operation 402.

In an operation 406, an alert is transmitted to client machines approaching the cell. The client machines approaching the cell may be identified based on GPS data or a received handover request. The alert may include a description of the overcrowded area, directions to avoid the overcrowded area, or other information.

In an operation 408, the exit routes are determined based on an exit assigned as a destination to the user of the client device. The exit route may follow a predetermined exit route, an exit route received from a public safety official, or an exit route that is determined based on traffic patterns of people leaving the overcrowded area. A database containing records of permanent and temporary features and defined exit routes may be accessed.

In an operation 410, directions to the assigned exits are transmitted to the client machines in the cell. The directions may be sent as more than one communication or as a single communication. In some instances, the directions may include a map of the overcrowded area or a map of the overcrowded area may be provided without directions.

Figure 5:
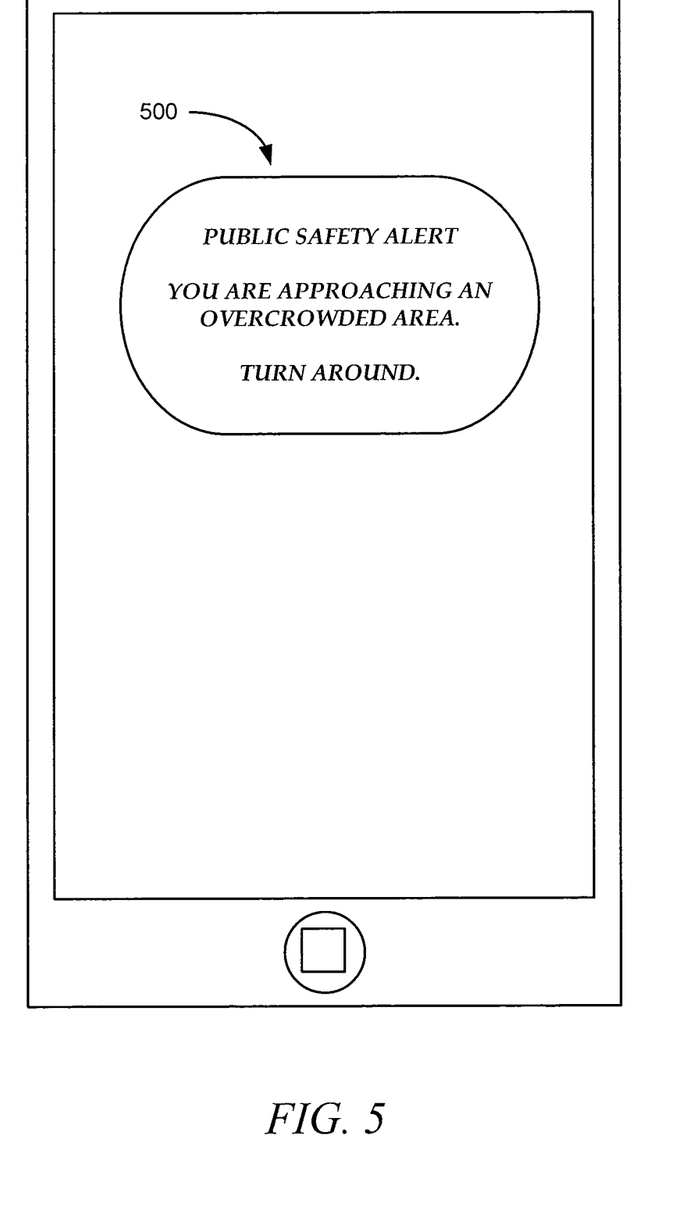
FIG. 5 is an illustration of an example user interface to alert a user, according to an example embodiment.

FIG. 5 is an illustration of an example graphical user interface to alert a user, according to an example embodiment. The user interface depicts an alert in the form of an application notification 500 received via an application installed on a smart phone. The alert may be an email, a text message (e.g., an SMS message), a multimedia message (e.g., an MMS message), an application notification on a smart phone, a navigation alert on a GPS device, or another electronic transmission. In some instances, the alert may include an option or link selectable by the user to access additional information about the overcrowded area or directions to avoid the overcrowded area. In some instances, the alert may be customized based on additional information about the user (e.g., using velocity or location to distinguish a user walking towards the overcrowded area from a user driving on a highway to the overcrowded area).

Figure 6:
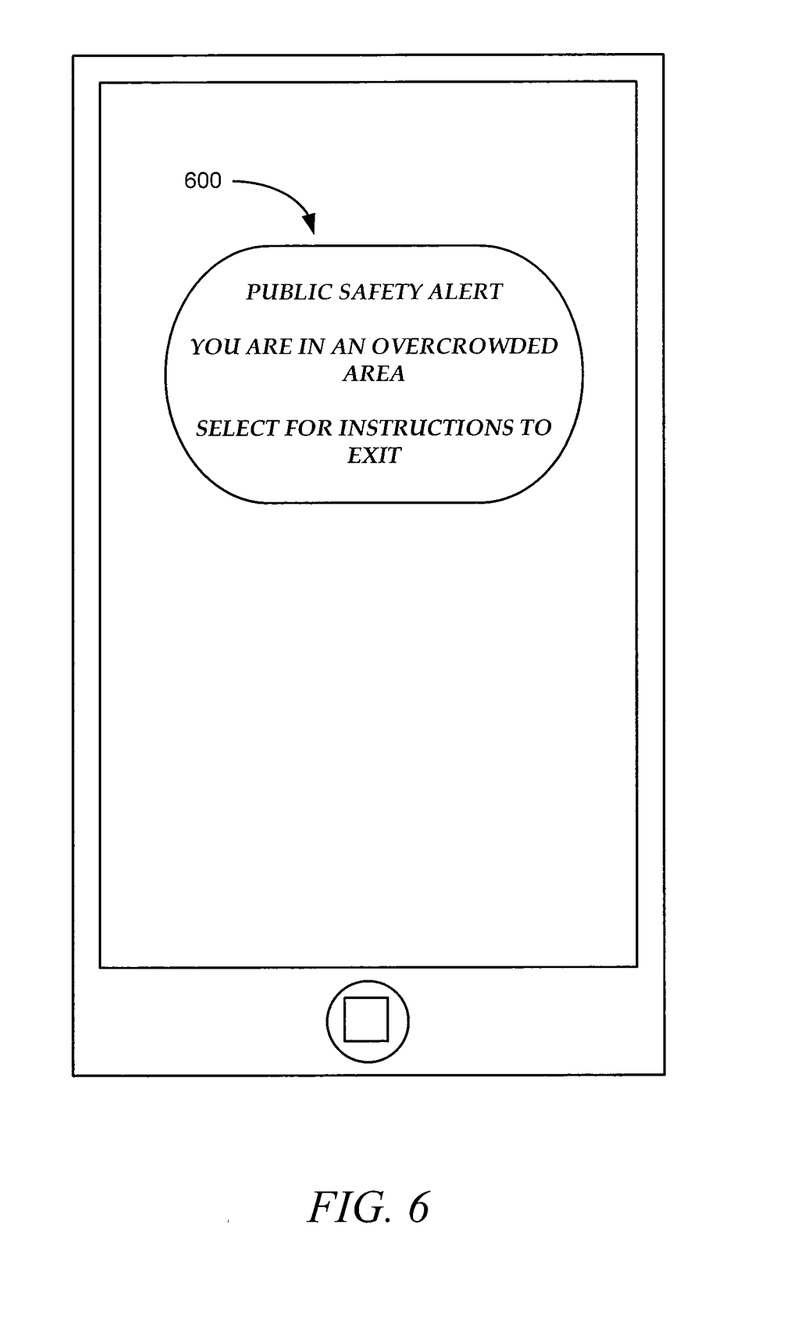
FIG. 6 is an illustration of an example user interface to alert a user, according to an example embodiment.

FIG. 6 is an illustration of an example graphical user interface to alert a user, according to an example embodiment. The user interface depicts an alert in the form of an application notification 600 received via an application installed on a smart phone. The alert may be an email, a text message (e.g., an SMS message), a multimedia message (e.g., an MMS message), an application notification on a smart phone, a navigation alert on a GPS device, or another electronic transmission. The alert may indicate to the user that the user is in an overcrowded area and provide an option or a link selectable by the user to access instructions or directions to an exit.

Figure 7:
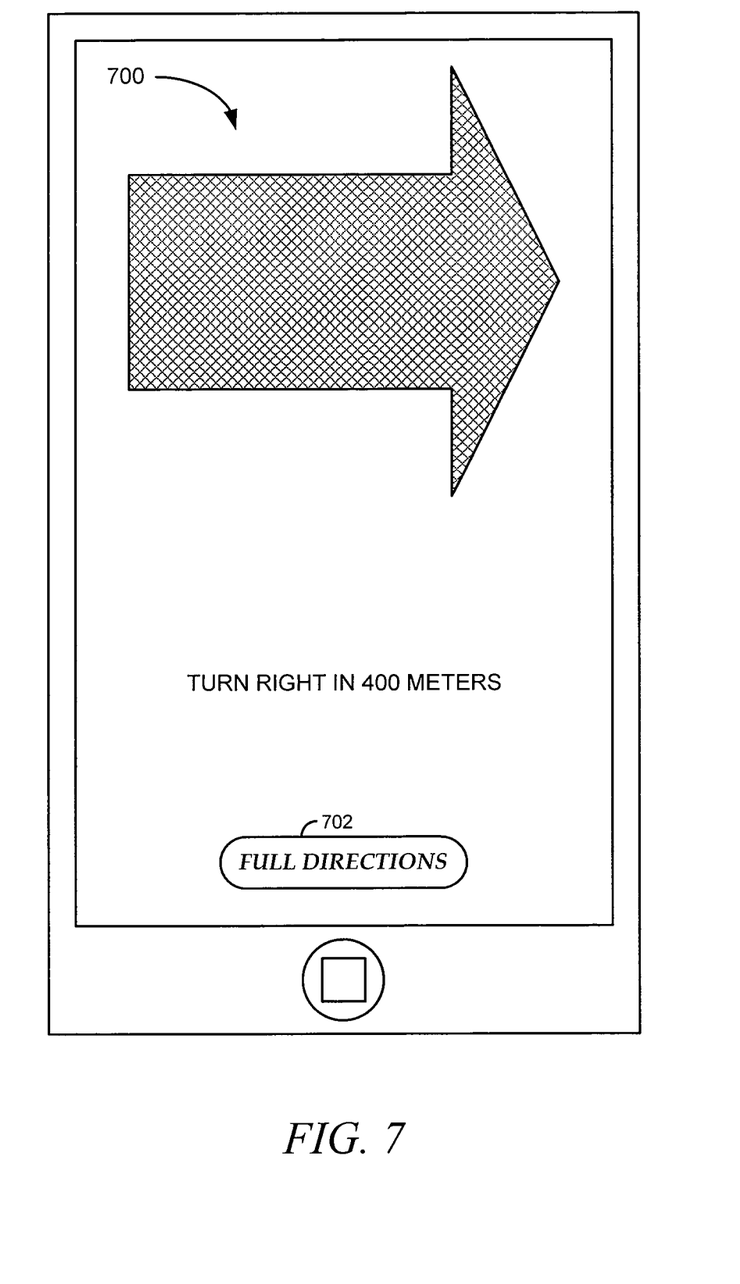
FIG. 7 is an illustration of an example user interface to provide instructions to a user, according to an example embodiment.

FIG. 7 is an illustration of an example graphical user interface to provide instructions 700 to a user, according to an example embodiment. The user interface of FIG. 7 may be presented as a display on the screen of the client machine upon receiving a selection of the alert 600 of FIG. 6. As depicted, the instructions 700 include directions to "turn right in 400 meters" accompanied by a large arrow pointing to the right. The interface further includes a button 702 selectable by the user to access a more complete set of direction that optionally indicates the destination assigned to the client device.

Figure 8:
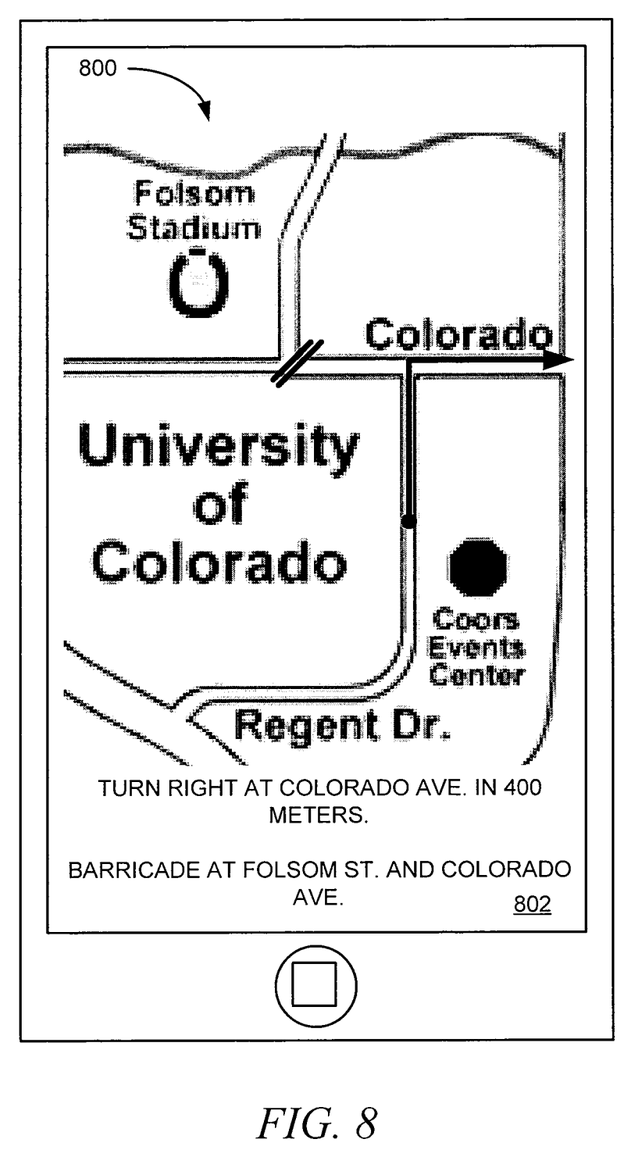
FIG. 8 is an illustration of an example user interface to provide instructions, according to an example embodiment.

FIG. 8 is an illustration of an example graphical user interface to provide instructions 800, according to an example embodiment. The interface of FIG. 8 may be presented as a display on the screen of the client machine upon receiving a selection of the alert 600 of FIG. 6 or the button 702 of FIG. 7. The graphical user interface of FIG. 8 includes a map 800 and written instructions 802. The map 800 includes a map of the overcrowded area, an indication of the user's current location, a depiction of the route to the exit assigned to the user of the client device, and an indication of a temporary feature (e.g., a police blockade at Folsom Street and Colorado Avenue).

In instances where the client device does not have GPS enabled, a map 800 may only be provided to the client device with an indication of the exit and exit route assigned to the user. The user may be expected to determine his or her location on the map 800.

The instructions 802 may be included in the graphical user interface and may include additional information about temporary features and a next turn to make to stay on the assigned exit route.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-readable Medium

Figure 9:
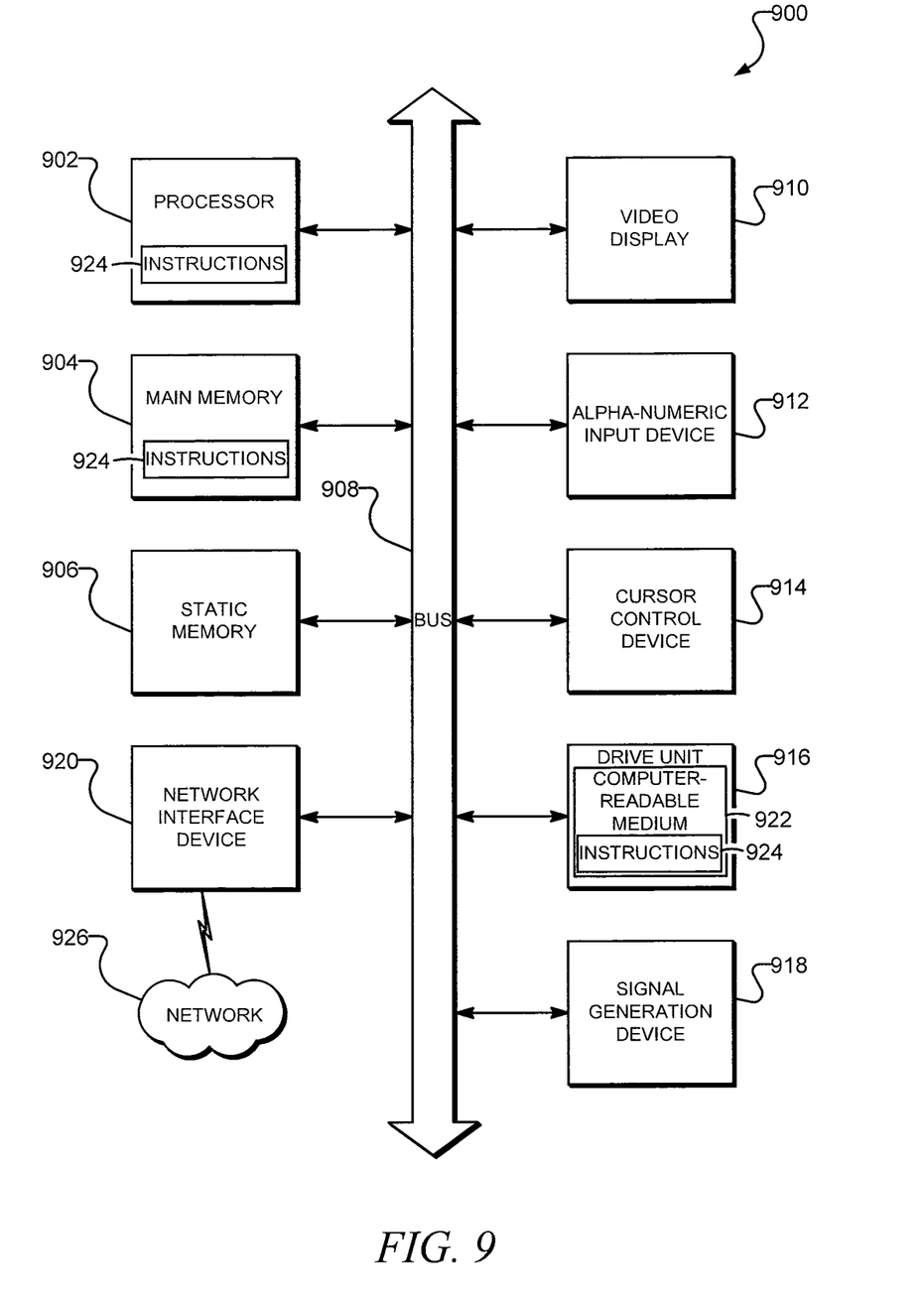
FIG. 9 is a block diagram of machine in the example form of a computer system within which a set instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or touch-sensitive display screen), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
a census module to determine a number of mobile client devices located in a defined geographical area;
a capacity module to determine that a capacity assigned to the defined geographical area is exceeded based on the number of mobile client devices located in the defined geographical area, the capacity being a number of people that is used to provide an indication that the defined geographical area is overcrowded;
an exit module to assign at least one exit route to an exit of the defined geographical area to a client device of the mobile client devices within the defined geographical area; and
a navigation module to transmit instructions comprising the exit route to the client device.

2. The system of claim 1, wherein the mobile client devices are selected from the group consisting of cellular telephones, smart phones, GPS navigation devices, and tablet computers.

3. The system of claim 1, wherein the defined geographical area is a cell of a cellular telephone network.

4. The system of claim 1, wherein the defined geographical area is defined by a plurality of global positioning system (GPS) coordinates.

5. The system of claim 1, wherein the census module is further to determine the number of mobile client devices based on a number of client devices registered to a cell tower or based on GPS coordinates on the mobile client devices.

6. The system of claim 5, wherein, if the client device is registered with the cell tower and has provided GPS coordinates, the census module is further to discount the number of client devices by one.

7. The system of claim 1, wherein the census module is further to provide an estimate of the number of people in the defined geographical area based on an assumed number of people associated with each mobile client device of the mobile client devices.

8. The system of claim 1, wherein the capacity module is further to determine the capacity of the defined geographical area based on a present date and time.

9. The system of claim 1, wherein the capacity module is further to determine the capacity of the defined geographical area based on a defined function.

10. The system of claim 1, wherein the exit module is to assign the exit route based on one or more temporary features within the defined geographical area.

11. The system of claim 1, wherein the instructions are selected from the group consisting of an email, an short message service (SMS) message, an Instant Message (IM), a multimedia message service (MMS) message, an application or an application notification on a smart phone, or a navigation alert on a GPS navigation device.

12. The system of claim 1, wherein the instructions include a map of the overcrowded area.

13. The system of claim 12, wherein the map includes an indication of a location of one or more temporary features.

14. The system of claim 12, wherein the map includes an indication of the assigned exit route.

15. The system of claim 1, wherein the exit module is to receive the exit route from a second mobile client device of the mobile client devices.

16. The system of claim 1, further comprising an alert module configured to transmit an alert to a second set of client devices approaching the defined geographical area.

17. The system of claim 16, wherein the alert module is further to determine a velocity of the second set of client devices and select the alert from a plurality of available alerts based on the velocity.

18. The system of claim 16, wherein the alert includes a map indicating a location of the defined geographical area.

19. A method comprising:
determining a number of mobile client devices located in a defined geographical area;
determining, by a processor, that a capacity assigned to the defined geographical area is exceeded based on the number of mobile client devices located in the defined geographical area, the capacity being a number of people that is used to provide an indication that the defined geographical area is overcrowded;
assigning at least one exit route to an exit of the defined geographical area to a client device of the mobile client devices within the defined geographical area; and
transmitting instructions comprising the exit route to the client device.

20. A non-transitory machine-readable medium having instructions embodied thereon which, when executed by at least one processor, cause the at least one processor to perform operations comprising:
determining a number of mobile client devices located in a defined geographical area;
determining that a capacity assigned to the defined geographical area is exceeded based on the number of mobile client devices located in the defined geographical area, the capacity being a number of people that is used to provide an indication that the defined geographical area is overcrowded;
assigning at least one exit route to an exit of the defined geographical area to a client device of the mobile client devices within the defined geographical area; and
transmitting instructions comprising the exit route to the client device.

* * * * *